United States Patent
Hagemann et al.

(10) Patent No.: US 11,215,812 B2
(45) Date of Patent: Jan. 4, 2022

(54) OPTICAL CONVERTER WHEEL

(71) Applicant: SCHOTT AG, Mainz (DE)

(72) Inventors: Volker Hagemann, Nieder-Olm (DE);
Albrecht Seidl, Niedernberg (DE);
Sylvia Biedenbender, Bingen (DE);
Günter Weidmann, Flonheim (DE)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 16/920,784

(22) Filed: Jul. 6, 2020

(65) Prior Publication Data
US 2021/0003838 A1 Jan. 7, 2021

(30) Foreign Application Priority Data

Jul. 4, 2019 (DE) .................. 10 2019 118 020.1

(51) Int. Cl.
G03B 21/20 (2006.01)
H04N 9/31 (2006.01)
G02B 26/00 (2006.01)
G02B 1/12 (2006.01)
F21V 9/45 (2018.01)

(52) U.S. Cl.
CPC .............. *G02B 26/008* (2013.01); *F21V 9/45* (2018.02); *G02B 1/12* (2013.01)

(58) Field of Classification Search
CPC ............. G03B 21/204; G03B 21/2033; G03B 21/206; H04N 9/3158; G02B 26/008
See application file for complete search history.

(56) References Cited

U.S. PATENT DOCUMENTS

| 2015/0241046 A1 | 8/2015 | Hagemann |
| 2015/0329778 A1 | 11/2015 | Menke |
| 2018/0246261 A1 | 8/2018 | Templin |
| 2019/0049075 A1* | 2/2019 | Ishige .................. F21V 9/32 |
| 2020/0278599 A1* | 9/2020 | Takasawa ............ H04N 9/3155 |

FOREIGN PATENT DOCUMENTS

| DE | 102013100832 | 7/2014 |
| DE | 102014102350 | 8/2015 |
| DE | 102015113562 | 2/2017 |
| DE | 102015114095 | 3/2017 |

(Continued)

OTHER PUBLICATIONS

ASTM E 1461-01 (2001), "Standard Test Method for Thermal Diffusivity by the Flash Method", 13 pages.

(Continued)

*Primary Examiner* — Ryan D Howard
(74) *Attorney, Agent, or Firm* — Ohlandt, Greeley, Ruggiero & Perle, L.L.P.

(57) ABSTRACT

An optical converter wheel, a method of producing, and a method of using are provided. The wheel includes an inorganic converter material that converts light of a first wavelength into light of a second wavelength and a converter substrate. The converter substrate has a coefficient of thermal expansion $CTE_{KS}$ of 4 to $18 \times 10^{-6}$ 1/K in a range from 20° C.-300° C. and a thermal conductivity of at least 50 W/mK at 20° C.

21 Claims, 4 Drawing Sheets

(56) References Cited

FOREIGN PATENT DOCUMENTS

EP 3505503 7/2019
WO 2016161557 10/2016

OTHER PUBLICATIONS

DIN 51045-1 (Aug. 2005), "Determination of the thermal expansion of solids—Part 1: Basic Rules", with English translation, 29 pages.
DIN 51045-2 (Apr. 2009), "Determination of linear thermal expansion of solids—Part 2: Testing of fired fine ceramic materials using the dilatometer method", with English translation, 16 pages.
DIN 51045-4 (Jan. 2007), "Determination of linear change of solids by thermal effect using the dilatomer method—Part 4: Testing of fired heavy ceramic materials", with English translation, 11 pages.

\* cited by examiner

OPTICAL CONVERTER WHEEL

CROSS REFERENCE TO RELATED APPLICATIONS

This application claims benefit under 35 USC § 119 of German Application 10 2019 118 020.1 filed Jul. 4, 2019, the entire contents of which are incorporated herein by reference.

BACKGROUND

1. Field of the Invention

The present invention relates to an optical converter wheel comprising at least one inorganic converter material for at least partly converting light of a first wavelength into light of a second wavelength, and at least one converter substrate, characterized in that the converter substrate has a coefficient of thermal expansion $CTE_{KS}$ of 4 to $18 \times 10^{-6}$ 1/K, preferably 5 to $15 \times 10^{-6}$ 1/K, particularly preferably 5 to $10 \times 10^{-6}$ 1/K in the range from 20° C.-300° C., and a thermal conductivity of at least 50 W/mK, preferably 100 W/mK, particularly preferably 150 W/mK, at 20° C.

The invention furthermore relates to a method for producing the optical converter wheel and to the use thereof.

2. Description of Related Art

Optical converter arrangements are constructed from an optical converter material and a converter substrate. The optical converter material is typically a photoluminescent material, also referred to as phosphor, light converter or fluorescence converter, which absorbs light of a first wavelength and emits light in a second wavelength. In this case, the optical converter material is excited by a primary radiation light source with a first wavelength. In this case, the light from the primary radiation light source is at least partly converted into secondary radiation with a second wavelength by the optical converter material and is emitted. Besides mechanical stabilization, the converter substrate also serves for heat dissipation and light reflection.

Known photoluminescence converters contain the phosphor in a binder material ("Phosphor in Binder"—PIB), for example, wherein the binder material can be silicone ("Phosphor in Silicone"—PIS) or glass ("Phosphor in Glass"—PIG). Alternatively, the photoluminescence converter can be a ceramic photoluminescence converter. In this case, the ceramic can consist completely of the phosphor, such that no binder material is necessary. While the elastic PIS material can be applied directly to the converter substrate e.g. by means of printing methods, the rigid converter rings composed of ceramic or glass are typically applied by adhesive bonding.

Optical converters find application in static or dynamic arrangements. The dynamic application of optical converters consists in so-called converter wheels that rotate rapidly, such that the converter material moves past under the light spot from the primary radiation source.

Known converter wheels are constructed from a circular aluminium sheet having a central hole as converter wheel substrate and an optical converter material. In this case, the optical converter material can have a ring shape or consist of ring segments.

WO 2016/161557 A1 describes for example converter wheels containing ceramic converter materials. Besides a porous ceramic converter material, these comprise a highly reflective layer on the side of the converter material facing away from the excitation light, and on the side facing the excitation light a filling layer provided with at least one optical layer, for example an antireflective layer.

Converter wheels of this type are typically used as part of the light source in projectors, but can also find application in other high-power light sources. In such a light source, they are connected to a motor that rotates at typically at least 7200 revolutions per minute. Light is generated by a blue-emitting laser radiating onto the photoluminescence converter, which then converts blue light into yellow or green light and emits it. In this case, part of the incident light power is converted into heat in the converter material. Temperatures far in excess of 100° C. can be attained with laser powers of several 100 W. This heat has to be dissipated from the converter as efficiently as possible in order to avoid an excessively great increase in temperature in the optical converter material, since in converter materials the converter efficiency decreases as the temperature increases. This effect is attributable here to so-called "thermal quenching".

What may be particularly problematic is that the heating of the converter, depending on the converter material, can result in destruction of the converter material.

In static applications, the converter does not move. Here, too, the heating of the converter can result in destruction of the converter material. Here attempts are made to dissipate the heat that arises during the light conversion process by way of a heat sink linked to the converter material. Materials having good thermal conductivity, e.g. composed of metals such as copper or aluminium or else composed of ceramics such as aluminium nitride or aluminium oxide, can serve as a heat sink.

SCHOTT's own patent application DE 10 2015 113 562 A1 discloses a static converter-heat sink composite, wherein the optical converter material is connected by a metallic link to a converter substrate serving as a heat sink. The optical converter described comprises a copper substrate, for example, to which the optical converter material is applied by means of an Au/Ag solder.

As explained, the heating of the converter can result in destruction of the converter material or the converter per se. Since the chosen converter substrate and the optical converter material have different coefficients of thermal expansion, stresses can occur during the heating of the optical converter, in particular during the heating of converter wheels, which stresses can result in the converter breaking. There is the risk of destruction particularly if the ceramic converter material is subjected to tensile stresses. The latter arise e.g. for an operating temperature T if the optical converter is stress-free at a temperature T0<T and if the coefficient of thermal expansion of the converter substrate is greater than that of the ceramic converter material. Furthermore, high operating temperatures in the case of an adhesively bonded converter arrangement can result in the failure of the adhesive layer that serves for connecting converter substrate and converter material. This failure may be a reduction of the adhesive strength, as a result of which the converter material detaches from the converter substrate. This failure mechanism is observed e.g. in the case of adhesive bonding with silicone. In the case of adhesive bonds with epoxy resin adhesives, a discoloration of the adhesive can occur, as a result of which the conversion efficiency of the converter arrangement is reduced since part of the light generated is absorbed.

SUMMARY

It was therefore an object of the present invention to find optical converters which do not have the disadvantages mentioned above. In particular, the intention is to find converters which have a high thermal stability even at high temperatures.

This object was achieved by means of an optical converter wheel comprising at least one inorganic converter material for at least partly converting light of a first wavelength into light of a second wavelength, and a converter substrate, characterized in that the converter substrate has a coefficient of thermal expansion $CTE_{KS}$ of 4 to $18 \times 10^{-6}$ 1/K, preferably 5 to $15 \times 10^{-6}$ 1/K, particularly preferably 5 to $10 \times 10^{-6}$ 1/K, and a thermal conductivity of at least 50 W/mK, preferably 100 W/mK, particularly preferably 150 W/mK, at 20° C.

It has been found that converter wheels of this type have comparatively low thermal stresses between converter substrate and converter material even at high temperatures, said thermal stresses being lower than the breaking strength of the converter material.

The coefficient of thermal expansion (CTE) within the meaning of the present invention describes the change in the dimensioning of a material in the event of temperature changes and is based on the substance-specific effect of thermal expansion. Reference is specifically made to the coefficient of thermal linear expansion α, which is defined in accordance with the following formula (I):

$$\alpha L = \frac{dL}{dT} \quad (I)$$

The coefficient of thermal expansion within the meaning of the invention is determined in accordance with DIN 51045 (1998). The converter wheel comprises at least one converter substrate. Suitable converter substrates may be, in principle, all materials which have a sufficient mechanical and thermal loading capacity for application in a converter wheel.

According to the invention, the converter substrate has a coefficient of thermal expansion $CTE_{KS}$ of 4 to $18 \times 10^{-6}$ 1/K, preferably of 5 to $15 \times 10^{-6}$ 1/K, and particularly preferably of 5 to $10 \times 10^{-6}$ 1/K. According to the invention, the specified CTE denotes the coefficient of expansion for the range of 20 to 300° C.

In one preferred embodiment of the invention, the converter substrate contains at least one ceramic K1, at least one metal M1 or at least one ceramic-metal composite KM.

"Ceramics K1" and "ceramics K2" within the meaning of the present application and as described in greater detail below are materials which contain or consist of one or more inorganic, non-metallic solid materials. Particularly preferably, ceramics K1 are materials which are inorganic, non-metallic and polycrystalline.

"Metals M1", "metals M2", "metals M2A" and "metals M2B" within the meaning of the present invention and as described in greater detail below are metallic materials which contain one or more metals and/or semimetals or consist of one or a plurality of metals and/or semimetals. This also encompasses alloys composed of two or more different metals and/or semimetals, and also laminates and material composites composed of two or more metals and/or semimetals.

Preferred ceramics K1 are selected from the group consisting of silicon nitride, gallium arsenide, gallium nitride, aluminium nitride, aluminium carbide, silicon carbide, AlSiC, AlSi, beryllium oxide and CuC, and also mixtures of two or more thereof; preferably, the at least one ceramic K1 is aluminium nitride.

Metals M1 according to the present invention also encompass, besides metals per se, alloys composed of two or more different metals and also laminates composed of two or more different metals.

Preferred metals M1 are selected from the group consisting of the metals iron, tungsten, molybdenum, chromium, copper, gold, cobalt, nickel, silicon, or alloys composed of two or more thereof and laminates or other material composites such as Cu/MoCu/Cu (PMC), WCu,Cu/Mo/Cu/Mo/Cu (S-CMC), or Cu/Mo/Cu (CMC), preferably iron, copper, or chromium, molybdenum, tungsten or alloys composed of two or more thereof, particularly preferably iron, nickel, or copper, particularly preferably iron.

One example of a preferred material composite is tungsten-copper (WCu). This is a composite material having a heterogeneous structure. WCu is produced by pressing and sintering tungsten powder, for example, a porous blank being produced, which is subsequently dipped into liquid copper in order to close the remaining pores.

It is clear to the person skilled in the art that metals M1 which substantially contain one metal or an alloy composed of two or more metals can furthermore contain metallic and/or non-metallic additives and/or impurities, for example up to 4% by weight of carbon.

In a further preferred embodiment, the converter substrate contains a ceramic-metal composite KM that preferably contains at least one ceramic K2 and at least one metal M2.

In this case, the at least one ceramic K2 and the at least one metal M2, and also the proportion of K2 and M2 in the resulting composite (for example by virtue of the layer thickness of the respective materials) are chosen such that the resulting composite KM has a thermal conductivity and a CTE in the range according to the invention.

Preferably, the at least one ceramic K2 is a ceramic selected from the group consisting of silicon nitride, gallium arsenide, gallium nitride, aluminium nitride, aluminium carbide and silicon carbide, AlSiC, AlSi, beryllium oxide, CuC, and aluminium oxide, preferably aluminium oxide and aluminium nitride, particularly preferably aluminium oxide.

Preferred metals M2 are selected from aluminium, iron, tungsten, molybdenum, chromium, copper, gold, cobalt, nickel, silicon, or alloys composed of two or more thereof, laminates such as Cu/MoCu/Cu (PMC), WCu, Cu/Mo/Cu/Mo/Cu (S-CMC), or Cu/Mo/Cu (CMC), preferably iron, copper, or chromium, molybdenum, tungsten or alloys composed of two or more thereof, particularly preferably iron, nickel, or copper.

Preferably, the at least one metal M2 is copper.

In one preferred embodiment, the ceramic-metal composite KM is a layer composite, that is to say that a first layer of a first material having a specific thickness d1 has applied to it at least one further second layer of a material different from the first material and having a specific thickness d2. Preferably, the layer composite comprises at least two layers, particularly preferably at least 3, very particularly preferably 3 layers. Such a composite composed of three layers within the meaning of the present invention is also called a "sandwich composite" hereinafter.

In one preferred embodiment, the ceramic-metal composite KM is a sandwich composite, preferably comprising a first layer composed of a first metal M2A, followed by a second layer composed of a ceramic K2 and also a third layer composed of a second metal M2B, wherein the metals M2A and M2B are identical or different. The metals M2A and M2B are preferably identical. In this case, M2A and M2B is preferably Cu or Al, particularly preferably Cu. Preferably, the ceramic K2 is aluminium nitride or aluminium oxide, particularly preferably aluminium oxide. Sandwich composites of this type are commercially available for example as ceramic substrates from Rogers Corporation (Curamik®).

As explained above, the converter substrate according to the invention has a coefficient of thermal expansion $CTE_{KS}$ of 4 to $18\times10^{-6}$ 1/K, preferably of 5 to $15\times10^{-6}$ 1/K, and particularly preferably of 5 to $10\times10^{-6}$ 1/K. According to the invention, the specified CTE denotes the coefficient of expansion for the range of 20 to 300° C.

The coefficient of thermal expansion (CTE) within the meaning of the present invention describes the change in the dimensioning of a material in the event of temperature changes and is based on the substance-specific effect of thermal expansion. Reference is specifically made to the coefficient of thermal linear expansion $\alpha$, which is defined in accordance with the following formula (I):

$$\alpha L = \frac{dL}{dT} \tag{I}$$

In embodiments in which the converter substrate comprises more than one material, the expression "coefficient of thermal expansion" refers to the average coefficient of thermal expansion of the entire converter substrate.

If the converter substrate is for example a ceramic-metal layer composite, consisting of at least one layer composed of ceramic K2 and at least one layer composed of metal M2, the average coefficient of thermal expansion $\tilde{\alpha}$ is calculated as follows:

$$\tilde{\alpha} = \frac{\alpha_{K2} E_{K2} d_{K2} + \alpha_{M2} E_{M2} d_{M2}}{E_{K2} d_{K2} + E_{M2} d_{M2}}$$

wherein the symbols have the following meanings:
$\tilde{\alpha}$ average coefficient of thermal expansion of the converter substrate $CTE_{KS}$
$\alpha_{K2}$ coefficient of thermal expansion of ceramic K2 [1/K];
$\alpha_{M2}$ coefficient of thermal expansion of metal M2 [1/K];
$E_{K2}$ modulus of elasticity of ceramic K2 [GPa];
$E_{M2}$ modulus of elasticity of metal M2 [GPa];
$d_{K2}$ layer thickness of ceramic K2 [m]; and
$d_{M2}$ layer thickness of metal M2 [m].

If the composite in this example comprises a total of more than two layers, for example a sandwich construction with the layer sequence Cu-aluminium oxide-Cu, then $d_{M2}$ denotes the total Cu layer thickness resulting from the two individual Cu layer thicknesses.

It is clear to the person skilled in the art that the formula can be extended as desired depending on the different materials used. In this regard, the average $CTE_{KM}$ of the composite material comprising two metal layers M2A and M2B and one ceramic layer K2 can be calculated as follows:

$$\tilde{\alpha} = \frac{\alpha_{K2} E_{K2} d_{K2} + \alpha_{M2A} E_{M2A} d_{M2A} + \alpha_{M2B} E_{M2B} d_{M2B}}{E_{K2} d_{K2} + E_{M2A} d_{M2A} + E_{M2B} d_{M2B}}$$

wherein the symbols have the following meanings:
$\tilde{\alpha}$ average coefficient of thermal expansion of the converter substrate $CTE_{KS}$
$\alpha_{K2}$ coefficient of thermal expansion of ceramic K2 [1/K];
$\alpha_{M2A}$ coefficient of thermal expansion of metal M2A [1/K];
$\alpha_{M2A}$ coefficient of thermal expansion of metal M2B [1/K];
$E_{K2}$ modulus of elasticity of ceramic K2 [GPa];
$E_{M2A}$ modulus of elasticity of metal M2A [GPa];
$E_{M2B}$ modulus of elasticity of metal M2B [GPa];
$d_{K2}$ layer thickness of ceramic K2 [m];
$d_{M2A}$ layer thickness of metal M2A [m]; and
$d_{M2B}$ layer thickness of metal M2B [m].

In one preferred embodiment of the invention, the converter substrate and the at least one converter material are chosen such that the difference between the coefficient of thermal expansion of the at least one converter material CTEKM and the coefficient of thermal expansion of the at least one converter substrate CTEKS is $CTE_{KM}$–CTEKS=$-5\times10{-6}$ 1/K to $2\times10{-6}$ 1/K, preferably $-3.5\times10^{-6}$1/K to $2\times10^{-6}$1/K.

According to the invention, the $CTE_{KS}$ of the at least one converter substrate is thus higher than the $CTE_1$ of the at least one converter material preferably by up to $5\times10^{-6}$1/K, preferably by up to $3.5\times10^{-6}$ 1/K, and lower than said $CTE_{KM}$ by up to $2\times10^{-6}$1/K.

The at least one optical converter material is preferably a converter material having a coefficient of thermal expansion $CTE_{KM}$ in the range of 6.5 to $8.5\times10^{-6}$1/K, preferably a ceramic optical converter material.

According to the invention, the converter substrate according to the present invention has a thermal conductivity of at least 50 W/mK, preferably 100 W/mK, particularly preferably 150 W/mK.

The thermal conductivity is preferably determined by means of the laser flash method in accordance with ASTM E 1461-01 (2001).

If the converter substrate is a substrate containing more than one material, then the specified thermal conductivity refers to the average thermal conductivity of the converter substrate.

If the converter substrate is for example a ceramic-metal layer composite consisting of a ceramic K2 and a metal M2, the average thermal conductivity $\tilde{\lambda}$ is calculated according to the following formula:

$$\tilde{\lambda} = \frac{\lambda_{K2} d_{K2} + \lambda_{M2} d_{M2}}{d_{K2} + d_{M2}}$$

wherein the symbols have the following meanings:
$\tilde{\lambda}$ average thermal conductivity of ceramic-metal composite KM;
$\lambda_{K2}$ thermal conductivity of ceramic K2 [W/mK];
$\lambda_{M2}$ thermal conductivity of metal M2 [W/mK];
$d_{K20}$ layer thickness of ceramic K2 [m];
$d_{M2}$ layer thickness of metal M2 [m].

It is clear to the person skilled in the art that the formula can be extended as desired depending on the different materials used. In this regard, the average thermal conductivity of a composite material comprising two metal layers composed of M2A and M2B and one ceramic layer K2 can be calculated as follows:

$$\tilde{\lambda} = \frac{\lambda_{K2} d_{1K2} + \lambda_{M2A} d_{M2A} + \lambda_{M2B} d_{M2B}}{d_{K2} + d_{M2A} + d_{M2B}}$$

wherein the symbols have the following meanings:
$\bar{\lambda}$ average thermal conductivity of ceramic-metal composite KM;
$\lambda_{K2}$ thermal conductivity of ceramic K2 [W/mK];
$\lambda_{M2A}$ thermal conductivity of metal M2A [W/mK];
$\lambda_{M2B}$ thermal conductivity of metal M2B [W/mK];
$d_{K2O}$ layer thickness of ceramic K2 [m];
$d_{M2A}$ layer thickness of metal M2A [m];
$d_{M2B}$ layer thickness of metal M2B [m].

If the composite in this example comprises a total of more than two layers, for example a sandwich construction with the layer sequence Cu-aluminium oxide-Cu, then $d_{M2}$ denotes the total Cu layer thickness resulting from the two individual Cu layer thicknesses.

The thicknesses of the individual layers are chosen such that the average thermal conductivity according to the invention and the average CTE of the ceramic-metal composite are obtained.

A comparatively small thickness of the converter substrate can have a positive effect on the weight and the moment of inertia of the converter wheel, as a result of which a weaker and thus often more cost-effective motor can be chosen for the converter wheel. However, a thickness chosen to be too small for the converter substrate can have an adverse effect since the lateral heat dissipation in the converter substrate and thus the cooling capacity are reduced as a result. In order to improve the cooling capacity particularly in the case of relatively thin converter substrates, cooling ribs, for example, can be fitted at the rear side of the converter wheel. In the present case, the rear side of the converter wheel preferably denotes that side of the converter wheel on which the converter material is not applied. Such converter wheels containing cooling ribs are described in DE 10 2014 102 350 A1, for example. These are not taken into account in the total thickness of the converter substrate mentioned below.

The converter substrate typically has a total thickness of less than 3 mm, preferably less than 2.5 mm, particularly preferably less than 2.0 mm and preferably less than 1.75 mm, and more than 0.3 mm, preferably more than 0.5 mm and particularly preferably more than 1.0 mm. In one particularly preferred embodiment, the at least one converter substrate has a total thickness of less than or equal to 1.5 mm.

According to the invention, the optical converter comprises at least one inorganic converter material. The converter material serves to convert incident excitation light of a first wavelength at least partly into light of a second wavelength.

Suitable converter materials comprise ceramic converter materials (also called optoceramic hereinafter) or converter materials in which phosphor particles are embedded in an inorganic matrix, preferably "Phosphor in Glass" (PIG), "Phosphor in Ceramic" (PIC) or "Phosphor in Inorganic" (PIT).

Preferably, the inorganic converter material is a ceramic converter material, also called "optoceramic" hereinafter, particularly preferably a doped garnet phosphor. Suitable ceramic converter materials and their production are described for example in SCHOTT's own patent application DE 10 2013 100 832 and EP 3505503.

The ceramic converter material according to the invention is preferably a single-phase, porous, preferably polycrystalline optoceramic, comprising a ceramic phase $A_3B_5O_{12}$ where A is selected from the group of the elements Y, Gd, Lu and combinations thereof and B is selected from the group of the elements Al, Ga and combinations thereof, which contains Ce as at least one active element, wherein the density of the optoceramic is preferably <97%.

Particularly preferably, a cerium-doped yttrium aluminium garnet (Ce:YAG), a cerium-doped lutetium aluminium garnet (Ce:LuAG) or a cerium-doped gadolinium/yttrium aluminium garnet (Ce:Gd/YAG) is involved. In cerium-doped gadolinium/yttrium aluminium garnet (Ce:Gd/YAG), preferably 0-20% of the Y atoms in the crystal lattice are replaced by Gd.

Doped garnet phosphors are produced from a cerium-doped ceramic phase having the composition $A_3B_5O_{12}$, wherein A is selected from the group consisting of Y, Gd, Lu and a combination of two or more thereof, and B is selected from the group consisting of Al, Ga and a combination of two or more thereof.

In order to produce the ceramic element, in one embodiment, $A_2O_3$, $B_2O_3$ and $CeO_2$ in oxide form are used as starting materials, wherein A and B are as defined above. In this case, the amounts of substances used are preferably chosen such that a compound of the formula (III) is obtained

$$(A_{1-x}Ce_x)_3B_5O_{12} \qquad (III),$$

wherein $0.0005 > x > 0.05$. In other words, 0.05 to 5% of the atoms of type A are replaced by cerium.

This cerium concentration ensures a high conversion efficiency of the ceramic converter material and is coordinated with the scattering of the pores in the material in order to obtain a sufficient penetration depth of the primary source light.

In another embodiment, $A_3B_5O_{12}$ is used as the starting material and a suitable amount of $CeO_2$ is added.

In one preferred embodiment of the converter wheel according to the invention, the at least one converter material can be applied in the form of a monolithic ring on the converter substrate. In this case, the monolithic ring preferably has a circular shape.

In another embodiment of the converter wheel according to the invention, the at least one converter substrate can be applied in the form of one or more ring segments (also called circle segment) on the converter substrate. If more than one segment is applied, the individual segments can be identical or different.

In one preferred embodiment, only a single segment is applied to the converter substrate, this preferably being a segment with an angle of at least 180°, preferably at least 270°. In comparison therewith, a complete ring has an angle of 360°.

In another preferred embodiment, a multiplicity of segments are applied, for example 6 to 14 segments, which can be identical or different in size.

The layer thickness of the at least one converter material is typically less than 500 μm, for example from 10 to 500 μm, preferably from 50 μm to 500 μm, more preferably from 80 μm to 250 μm, and particularly preferably from 180 μm to 250 μm. In a further preferred embodiment, the converter material has a layer thickness of 100 to 200 μm.

In one preferred embodiment of the converter wheel according to the invention, the at least one inorganic converter material together with the at least one converter substrate are connected to one another by way of a connection layer. The connection layer is preferably formed from at least one adhesive, at least one glass, at least one ceramic adhesive or at least one metallic solder compound.

In one embodiment of the invention, the connection layer directly adjoins the converter material and the converter substrate.

In a further embodiment, the converter substrate, over at least part of its surface directed towards the converter component, is coated with a further layer, in particular a highly reflective layer, as described in greater detail below. In this embodiment, the connection layer directly adjoins the converter material and the highly reflective layer.

In a further embodiment, the converter material comprises a highly reflective layer on the side facing the converter substrate. In this embodiment, the connection layer adjoins the highly reflective layer and the converter substrate.

The person skilled in the art in the field of phosphorescence converters is able to choose the connection layer with regard to the requirements of the respective converter construction, for example with regard to the transparency of the connection layer.

In one preferred embodiment of the converter wheel according to the invention, the connection layer is formed at a temperature of at least 20° C., preferably at least 35° C., preferably at least 55° C., preferably at least 70° C.

In one preferred embodiment, the connection layer is formed from at least one adhesive. Suitable adhesives are organic adhesives having suitable properties for the specific application and the specific construction of the respective converter, for example with regard to thermal stability, thermal conductivity, transparency and curing behaviour.

In one preferred embodiment, filled and unfilled epoxy resins and silicones are involved.

In one preferred embodiment, the at least one adhesive is a filled adhesive.

In another preferred embodiment, the at least one adhesive is an unfilled adhesive.

Examples of suitable unfilled adhesives are, inter alia, the silicone adhesive Elastosil RT 601 from Wacker, epoxy resin adhesives from Delo or related products from BASF, Lanxess or Dow Chemical.

Connection layers based on adhesives typically have a layer thickness of 5 to 70 µm, preferably 10 to 60 µm, more preferably 20 to 50 µm and particularly preferably 30 to 50 µm.

In a further preferred embodiment, the connection layer is a glass, preferably selected from a solder glass or a thin glass.

A solder glass within the meaning of the present invention involves special glasses having a comparatively low softening point of less than or equal to 750° C., preferably less than or equal to 560° C. In principle, it is possible to use glass solders in various forms, for example as powder, as paste in a liquid medium or embedded in a matrix, which is applied to the converter substrate or the converter component. Application can be carried out by means of extrusion, by screen printing, by spraying or in loose powder form. The individual components of the converter are subsequently joined together.

In one preferred embodiment, use is made of a paste containing glass powder, for example a PbO-, $Bi_2O_3$-, ZnO-, $SO_3$- or a silicate-based glass, particularly preferably a silicate-based glass.

Thin glass within the meaning of the present application is thin glass having a maximum thickness of less than or equal to 50 µm and a softening point of less than or equal to 750° C., preferably less than or equal to 560° C. Glasses of this type are positioned between converter component and converter substrate and pressed together at a sufficiently high temperature and at a sufficiently high pressure. Suitable thin glasses are, inter alia, borosilicate glasses, for example available as D263® from SCHOTT.

Connection layers based on glass typically have a layer thickness of 15 to 70 µm, preferably of 20 to 60 µm, and particularly preferably 30 to 50 µm.

In another preferred embodiment, the converter material is connected to the converter substrate by way of a metallic solder compound.

Metallic solder compounds within the meaning of the present invention are alloys composed of two or more metals. Suitable metallic solder compounds have a melting point that is lower than the melting point or the decomposition point of the individual constituent parts of the optical converter wheel according to the invention. Constituent parts in this sense are deemed to be, for example, the at least one converter material, the at least one converter substrate, and also further optional constituent parts, such as highly reflective layers, for example.

The melting point of the metallic solder compound is preferably between 150° C. and 450° C., more preferably between 180° C. and 320° C. and particularly preferably between 200 and 300° C.

Suitable metallic solder compounds are, for example, silver solders and gold solders, preferably Ag/Sn, Ag/Au and Au/Sn solders.

Preferably, the respective solder connection can be produced by heating the arrangement comprising a converter component and a converter substrate in particular also by local heating, in particular by mechanical thermal contact, for example by contact with a preferably thermally controlled heating element, thus by contact with a heated body which is itself inductively heated, for example.

This enables a rapid and accurately apportioned heat input, which may be temporally advantageous and thermally very precise particularly for manufacture.

Alternatively or additionally, the respective solder connection can be produced by heating the arrangement comprising converter component and converter substrate also by local heating, in particular by radiation, focused thermal radiation, laser radiation, in particular also pulsed laser radiation.

If the respective solder connection is produced by heating the arrangement comprising converter component and converter substrate at reduced ambient pressure, with in particular reduced ambient pressure prevailing until the respective solder connection is produced, this results in a particularly void-free and homogeneous solder connection in which even unevennesses of the surface of the optical converter, of the heat sink and of the rest of the assembly can be better wetted and thus connected more completely by the solder connection.

In this context, the indication that the "solder connection is produced" means that the melting point of the alloy has been undershot until the respective solder has solidified, meaning that it has in each case a strength of more than 50% of the room temperature tensile strength of said solder, wherein room temperature is intended to be approximately 300 K.

Further details concerning the type and production of various solder connections can be gathered from SCHOTT's own application DE 102015 113 562 A1, which is incorporated by reference herein.

In another preferred embodiment, the converter material is connected to the converter substrate by way of a ceramic adhesive.

Ceramic adhesives of this type are typically substantially free of organic constituents and have a high thermal stability. Preferably, the ceramic adhesive is chosen such that the coefficient of thermal expansion and also the mechanical properties, for example Young's modulus, of the resulting connection layer are adapted to the corresponding properties of the converter substrate and/or of the converter material.

Suitable ceramic adhesives are produced from an inorganic, preferably pulverulent, solid and a liquid medium, preferably water. The inorganic solid can be for example MgO-, $SiO_2$-, $TiO_2$-, $ZrO_2$- and/or $Al_2O_3$-based solids. Preferably, $SiO_2$- and/or $Al_2O_3$-based solids are involved, particularly preferably $Al_2O_3$-based solids. The pulverulent solid can additionally comprise further pulverulent components which for example support the setting of the ceramic adhesive. By way of example, boric acid, borates or alkali metal silicates, such as sodium silicates, can be involved in this case.

Ceramic adhesives according to the invention can be mixed from the pulverulent solid and water for example directly before use and cure at room temperature.

In this case, the solid preferably has an average grain size $d_{50}$ of 1 to 100 μm, preferably 10 to 50 μm. Preferably, the ceramic adhesive has a coefficient of thermal expansion of $5\text{-}15\times10^{-6}$ 1/K, particularly preferably of 6 to $10\times10^{-6}$ 1/K. Suitable ceramic adhesives are produced for example from Resbond 920 or Resbond 940 HT (Polytec PT GmbH).

Connection layers based on ceramic adhesives typically have a layer thickness of 50 to 500 μm, preferably of 100 to 350 μm, and particularly preferably 150 to 300 μm.

The secondary light is emitted locally isotropically in the converter material, such that in the case of an arrangement in reflection, for example, light components of the secondary light are not emitted in the useful direction, but rather in the direction of the converter substrate. In order to be able to use these light components as well, the converter can comprise at least one highly reflective layer that specularly and/or diffusely reflects these light components.

Highly reflective layers within the meaning of the present invention preferably have a total reflectance of at least 90%, preferably at least 92%, more preferably at least 95% and particularly preferably 98%. The total reflection results from the specular reflection and the diffuse reflection.

For the purpose of the present invention, the specified total reflection preferably refers to light components with a wavelength of 380 nm to 780 nm, particularly preferably 450 to 750 nm.

In one preferred embodiment, the converter substrate itself serves as at least one highly reflective layer. This holds true in those embodiments of the invention in which the converter substrate has a sufficiently high total reflectance, for example in respect of diffusely reflective aluminium oxide as topmost layer of a ceramic-metal composite KM, or as partially exposed central layer of a sandwich composite according to the present invention.

In embodiments in which the converter substrate and the converter material are connected by way of a ceramic adhesive, preferably the ceramic adhesive serves as the at least one highly reflective layer. This holds true in those embodiments of the invention in which the ceramic adhesive has a sufficiently high total reflectance, for example if an $Al_2O_3$-based ceramic adhesive is used. In order to even further improve the reflection at the rear side of the converter material, a highly reflective layer can also be inserted between converter material and ceramic adhesive, for example by means of a dielectric coating with a highly reflective layer on the rear side of the converter material.

In other embodiments, too, the converter comprises at least one highly reflective layer as additional layer.

It is clear to the person skilled in the art that the at least one highly reflective layer is expediently situated behind the at least one converter material with respect to the primary light beam.

As explained above, the optical converter preferably comprises at least one connection layer that connects the converter material to the converter substrate.

With regard to the positioning of the at least one highly reflective layer in an optical converter, comprising a connection layer, this results in various arrangements in the optical converter:

In a first preferred embodiment, the at least one highly reflective layer is applied on at least one part of the surface of the converter substrate. In order that the light components emitted by the converter material can actually reach the highly reflective layer to a sufficient extent, it is expedient in this embodiment for the connection layer situated between the converter material and the highly reflective layer to be a transparent layer.

"Transparent" within the meaning of the invention means that the layer has a (pure) transmission of at least 80%, preferably at least 90%, particularly preferably at least 95% and more particularly preferably at least 98%, relative to the emitted light components.

In these embodiments, the at least one connection layer is accordingly preferably a transparent connection layer, preferably a glass or a transparent adhesive, particularly preferably a transparent silicone or transparent epoxy resin.

Preferably, at least 70%, preferably at least 80%, preferably at least 90%, of the surface and particularly preferably at least 99% of the surface of the converter substrate is covered with the at least one highly reflective layer lying below the area of the at least one converter material. With further preference, the entire surface of the converter substrate that faces the converter material is covered with the at least one highly reflective layer. It is furthermore preferred if certain portions of the highly reflective layer extend over the region covered with converter material in order to achieve as complete reflection as possible.

It is possible, of course, for the entire or substantially the entire surface of the converter substrate that faces the converter material to be covered with the at least one highly reflective layer.

In a second preferred embodiment, the at least one highly reflective layer is situated on at least one part of the surface of the at least one converter material. It is clear that said layer is situated on that side of the converter material which faces away from the side on which the primary light beam is incident. In other words, the layer is situated on the side of the converter material facing the converter substrate. In this embodiment, the connection layer is situated between the at least one highly reflective layer and the at least one converter substrate.

Preferably, at least 70% of the area facing away from the light beam, preferably at least 80% of the area, more preferably at least 90% of the area, and particularly preferably at least 99% of the area, of the at least one converter material is covered with the at least one highly reflective layer. In one particularly preferred embodiment, 100% of the area is covered with the at least one highly reflective layer.

The at least one highly reflective layer can be applied to the at least one part of the surface to be coated by means of spraying, adhesive bonding, vapour deposition.

The at least one highly reflective layer is preferably a silver layer, a Cr/Ag layer, or a silver-based layer. In the case of said Cr/Ag layer, Cr serves in particular as an adhesion promoter for the reflective Ag constituents. Suitable silver-based layers are available for example as MIRO-Silver® from Alanod and have a total reflectance of 98%. Corresponding silver-based layers are described for example in the German patent application DE 102015114095.

If the at least one highly reflective layer, preferably a silver layer, a Cr/Ag layer, or a silver-based layer, is applied on a converter substrate having an excessively high roughness, this can result in reflection losses. In embodiments in which the at least one highly reflective layer is applied directly on the substrate, the converter substrate is therefore preferably polished before the highly reflective layer is applied. In this case, the entire surface of the converter substrate can be smoothed or polished, or preferably only that part of the surface which is subsequently covered with the at least one highly reflective layer and the converter material. The polishing can be effected for example by machining methods, for example by means of diamond turning. Preferably, the diffuse proportion of the reflection at less than 20%, preferably less than 10% and particularly preferably less than 5% of the total reflection is achieved as a result of the smoothing of the surface of the converter substrate.

Since the total reflection results from the sum of diffuse and specular (or directional) reflection, a high specular reflection can be achieved in this way. The proportion of the total reflection that is constituted by the diffuse reflection is determined for example by a reflection measurement by means of an integrating or Ulbricht sphere, wherein a sphere that is closed—apart from the light inlet—is used in the measurement of the total reflection, while the light specularly reflected at the sample incorporated in an inclined manner can escape through an opening in the sphere for the measurement of the diffuse reflection.

The ceramic converter material can furthermore comprise further layers, for example antireflective layers, smoothing layers or protective layers in order to adapt the optical converter wheel according to the invention to the respective application and to improve the properties.

The optical converter according to the invention is a dynamic converter, a so-called converter wheel.

In the case of converter wheels, a photoluminescence material is applied to a rotating carrier disk, which supports the cooling of the converter arrangement. The excitation light excites the converter of customary design by way of a high-aperture optical unit, by way of which the photoluminescent light is also collected. However, if the photoluminescence lifetime is significantly longer than the time within which the excited converter region moves from the region of the illuminating and collecting optical unit, a large portion of the luminescent light can no longer be collected. This effect can optionally also be counteracted, however, by a correspondingly adapted optical unit or by lower tangential velocities.

The converter wheel according to the invention is preferably operated in reflection, wherein the excitation is preferably effected by a laser diode.

The invention furthermore encompasses the production of the optical converter wheel according to the invention. In this context, the preferred embodiments mentioned above are applicable in a corresponding manner.

The production of the optical converter wheel comprises the following steps: (a) providing a converter substrate; (b) optionally applying at least one highly reflective layer on at least one part of the surface of the converter substrate; (c) optionally applying at least one connection layer to the converter substrate from step a) or b) and/or to at least one converter material; (d) connecting the converter substrate to the at least one converter material from step a), b) or c).

The converter substrate is typically provided in the final wheel form. As an alternative thereto, however, it is also possible, of course, to bring the substrate to the desired end form after any of steps b), c) or d).

If the method according to the invention comprises a step b) as described above, in this case the at least one highly reflective layer is applied on at least one part of the surface of the converter substrate. The highly reflective layer is applied to that surface of the converter substrate which faces the converter material in the converter wheel obtained.

In one embodiment, the entire surface of the converter substrate is coated with the at least one highly reflective layer.

In another embodiment, that part of the surface of the at least one converter substrate which lies below the converter material in the converter wheel obtained is coated.

As already explained above in connection with the optical converter material according to the invention, the at least one highly reflective layer can be applied to the at least one part of the surface to be coated of the at least one converter material by means of spraying, adhesive bonding or vapour deposition.

Step c) of the method according to the invention comprises applying the connection layer to the converter substrate from step a) or b) and/or to at least one converter material.

In one preferred embodiment of the method according to the invention, the connection layer is applied to the at least one converter material. In another embodiment of the method according to the invention, the at least one connection layer is applied to the at least one converter substrate.

The temperature during steps c) and d) of the method according to the invention is set by the person skilled in the art depending on the chosen connection layer and the solidification behaviour thereof.

In one preferred embodiment, the method according to the invention comprises steps a), b) and d).

In another preferred embodiment, the method according to the invention comprises steps a), c) and d). Preferably, a converter material is used in this embodiment, wherein the surface facing the converter substrate is coated at least partly, preferably completely, with a highly reflective layer and/or the converter substrate itself has a sufficient reflectance. In one particularly preferred embodiment, the method comprises steps a), b), c) and d).

The optical converter according to the invention is used in dynamic optical applications. Preferably, the optical converter is used as a converter wheel in high-power laser projectors.

BRIEF DESCRIPTION OF THE DRAWINGS

The invention is described in greater detail below on the basis of preferred embodiments and with reference to the accompanying drawings.

DETAILED DESCRIPTION

In the following detailed description of preferred embodiments, identical reference signs in the various embodiments denote in each case identical or identically acting assemblies. In so far as significant functional deviations are present, they will be explained in greater detail in each case with reference to the embodiment affected.

Figure 8:
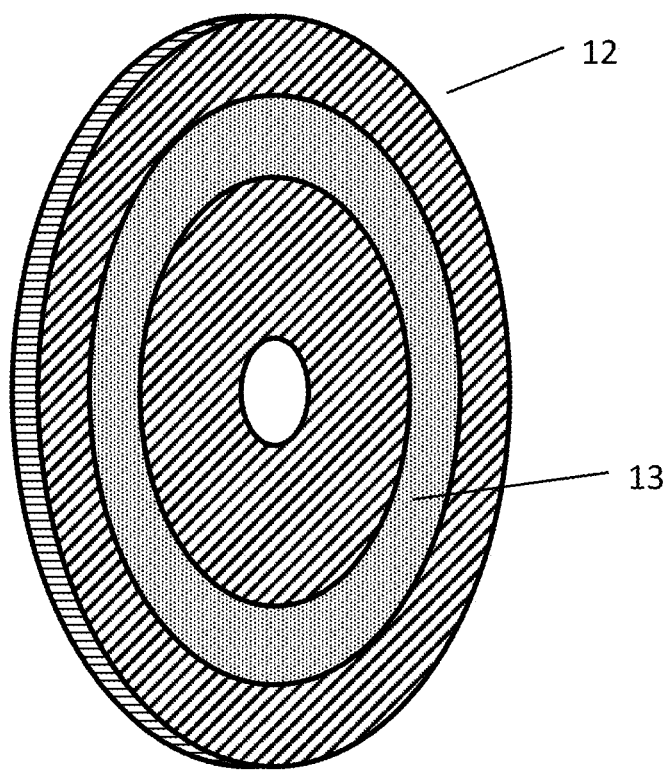
FIG. 8 shows a perspective view of an embodiment of a converter substrate according to the invention.

FIG. 8 shows the general schematic construction of a converter substrate according to the invention.

Figure 1:
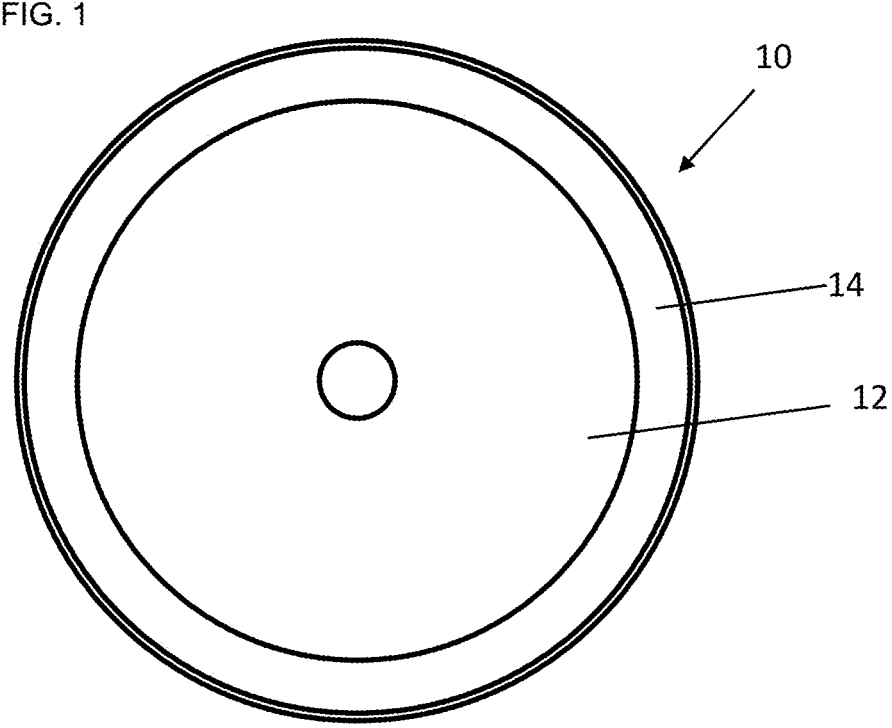
FIG. 1 and FIG. 2 show the general schematic construction of an optical converter wheel according to the invention.

Firstly, reference is made to FIG. 1, which depicts a plan view of the converter wheel 10 in accordance with various embodiments comprising a converter substrate 12 and a converter material 14. The converter material is applied in the form of a monolithic ring. As an alternative thereto, the converter material 14 can also be applied to the converter substrate 12 in the form of a plurality of individual segments, or in the form of an incomplete ring. If the converter material 14 is applied in the form of two or more segments, the individual segments can contain the same converter material 14 or, as an alternative thereto, consist of different converter materials 14.

Figure 2:
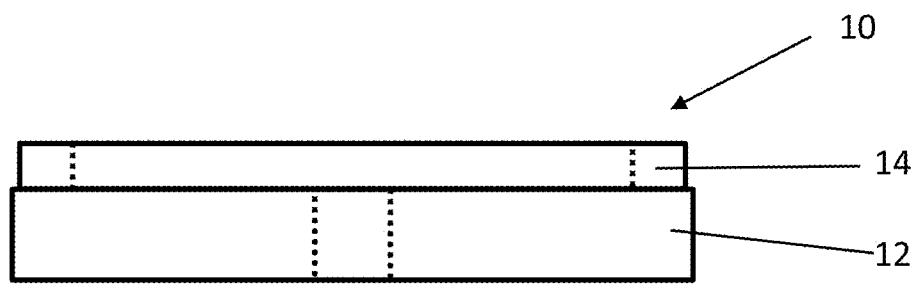

FIG. 2 shows a complete cross section through a schematically illustrated converter wheel 10, comprising a converter substrate 12 and a converter material 14.

Figure 3:
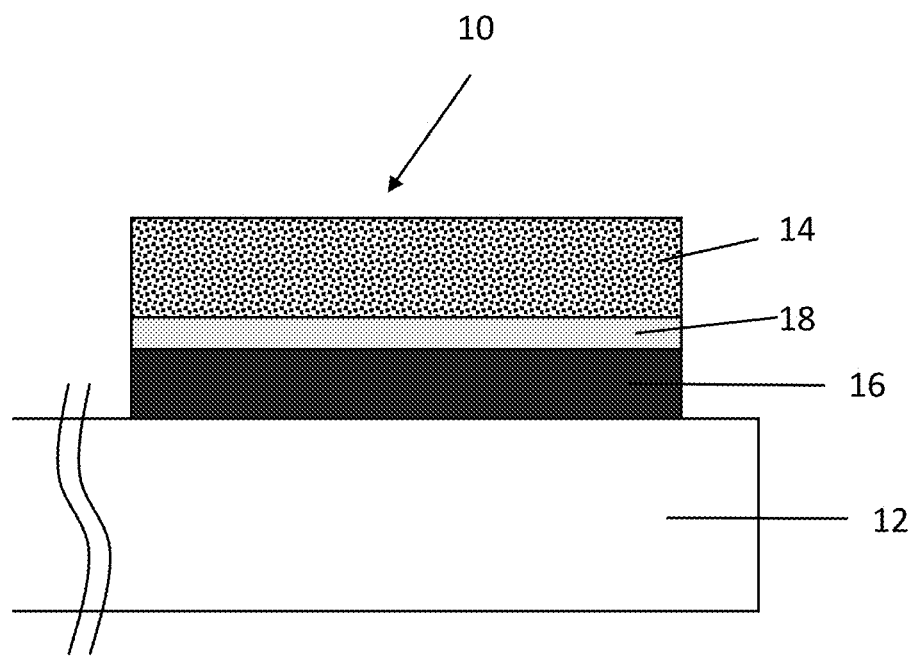
FIGS. 3 to 7 show side views of various embodiments of the converter wheel according to the invention.

FIG. 3 shows the cross section of a first embodiment of the converter wheel 10 according to the invention. Besides a converter substrate 12, a connection layer 16 and a converter material 14, this embodiment contains a highly reflective layer 18. The latter is applied on the converter material 14 and is situated between the converter material 14 and the connection layer 16 in the converter wheel 10 in accordance with the first embodiment according to the invention. Converter substrate 12 and converter material 14 correspond to those described further below in association with FIG. 5. The connection layer 16 is formed from an adhesive. Since the connection layer 16 in this embodiment does not have to satisfy particular requirements with regard to its transparency, it can alternatively also be formed from non-transparent materials, for example a metal solder. The highly reflective layer 18 is a silver layer.

Figure 4:
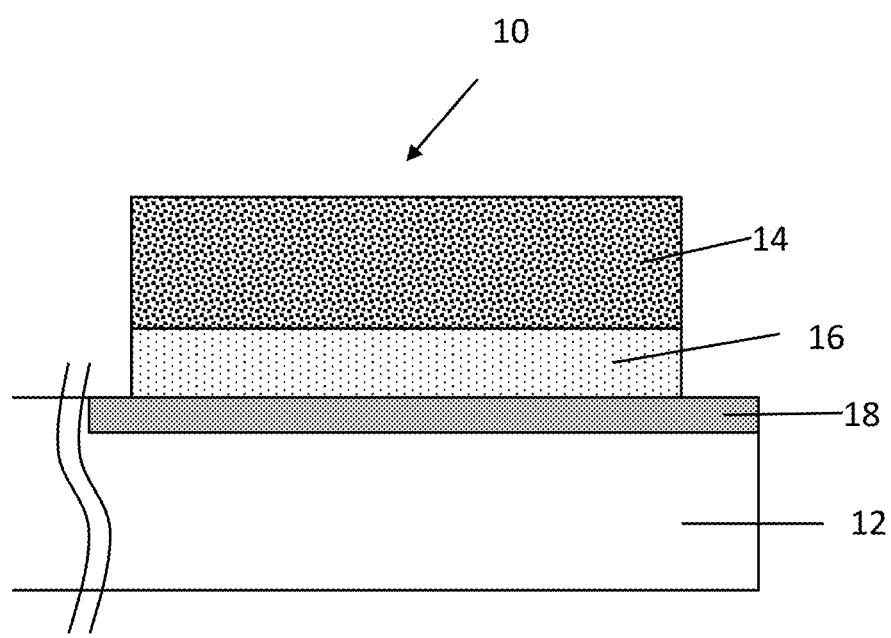

FIG. 4 shows the cross section of the side view of a second embodiment of the converter wheel 10 according to the invention. Besides a converter substrate 12, a connection layer 16 and a converter material 14, this embodiment also contains a highly reflective layer 18. The latter is applied on the converter substrate 12 and is situated between the converter substrate 12 and the connection layer 16 in the converter wheel 10. Converter substrate 12, converter material 14 and highly reflective layer 18 correspond to those described in associated with FIGS. 3 and 5. The connection layer 16 is a transparent connection layer 16 composed of a transparent adhesive.

Figure 5:
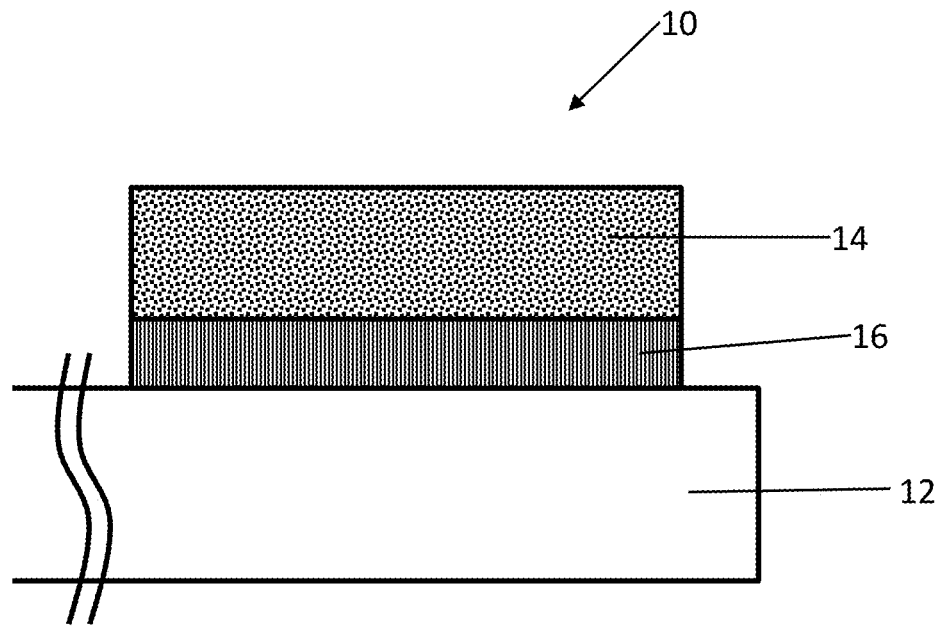

FIG. 5 shows the cross section of a third embodiment of the converter wheel (10) according to the invention. The converter material 14 therein is applied to a converter substrate 12 by means of a connection layer 16. In this case, the converter substrate 12 is aluminium nitride. As an alternative thereto, other ceramics K1 can also be used as converter substrate, for example silicon nitride, gallium arsenide, gallium nitride, aluminium carbide, silicon carbide, AlSiC, AlSi, beryllium oxide or CuC, provided that they have a sufficient total reflection for the respective application. The converter material 14 consists of an opto-ceramic. As an alternative thereto, other phosphors can also be used, such as, for example, "Phosphor in Glass", "Phosphor in Inorganic" or "Phosphor in Ceramic". Converter substrate 12 and converter material 14 are connected to one another by way of a connection layer 16. Glass that is used in the form of thin glass (D 263') during the production of the converter wheel 10 according to the invention serves as the connection layer 16. In this embodiment of the converter wheel 10 according to the invention, however, it is alternatively also possible to use other materials having sufficient transparency for forming the connection layer 16, in particular adhesives, such as epoxy resin or silicone adhesives.

Figure 6:
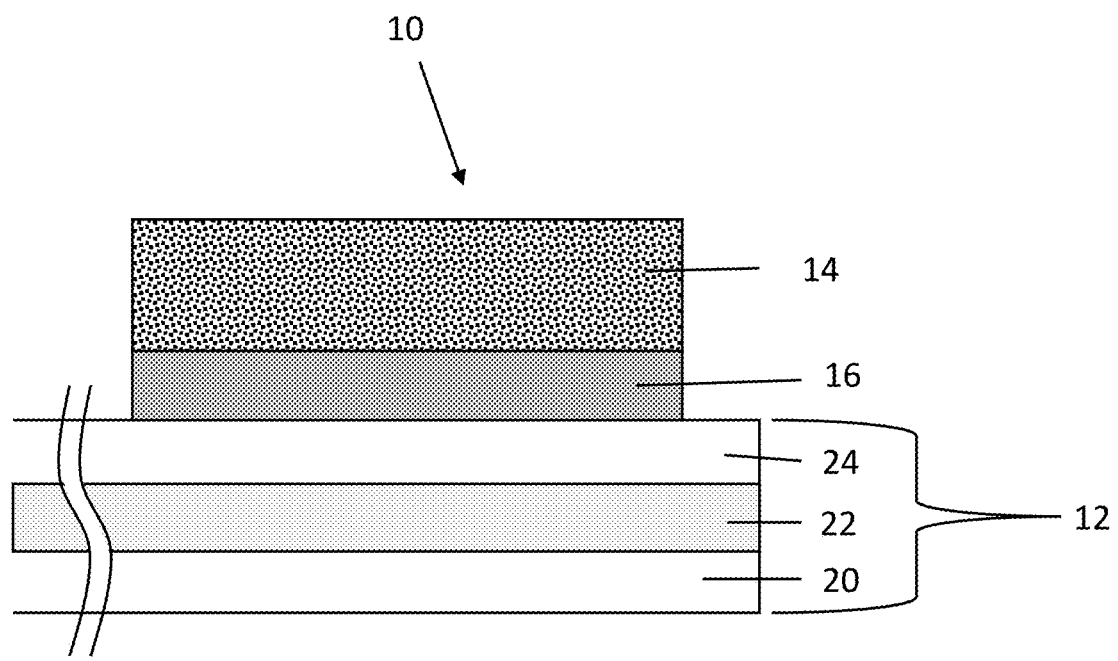

FIG. 6 shows the cross section of a fourth embodiment of the converter wheel 10 according to the invention. The converter wheel is constructed from a converter material 14 and a converter substrate 12, which are connected to one another by means of a connection layer 16. The converter substrate 12 in accordance with the fourth embodiment according to the invention is a ceramic-metal layer composite. The latter is constructed in a layered fashion from a first substrate layer 20, a second substrate layer 22 and a third substrate layer 24. The first substrate layer and the third substrate layer are a copper layer, and the second substrate layer 22 consists of aluminium oxide. Alternatively, the second substrate layer 22 can consist of aluminium nitride. The connection layer 16 is formed from a transparent adhesive. Furthermore, in a preferred embodiment (not depicted), the converter wheel 10 in accordance with the fourth embodiment according to the invention can comprise a highly reflective layer 18, which is applied directly on the third substrate layer 24. Alternatively, in a further preferred embodiment, a highly reflective layer 18 can be applied to the converter material 14 such that the highly reflective layer 18 is situated between the connection layer 16 and the converter material 14. The highly reflective layer 18 is formed from silver. In another embodiment, the side of the converter substrate 12 facing the converter material 14 comprises a polished region 13, on which the highly reflective layer 18 is optionally applied if the total reflection of the polished region 13 is insufficient for the application chosen.

Figure 7:
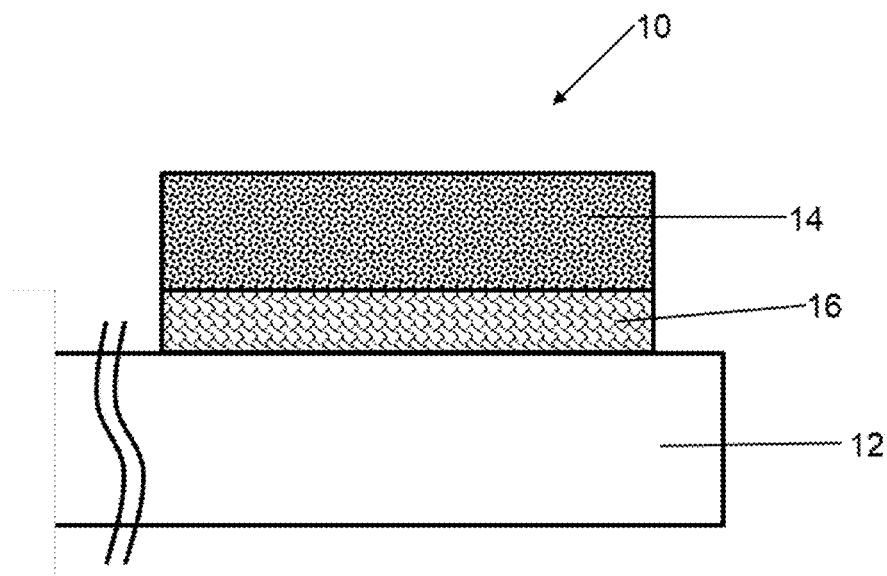

FIG. 7 shows the cross section of a fifth embodiment of the converter wheel 10 according to the invention. The converter wheel is constructed from a converter material 14 and a converter substrate 12, which are connected to one another by means of a connection layer 16. The converter substrate 12 in accordance with the fifth embodiment according to the invention is a metal, a ceramic or a ceramic-metal layer composite. The connection layer 16 is formed from a ceramic adhesive that functions as a diffuse reflector.

FIG. 8 shows a plan view of one embodiment of the converter substrate 12. The converter substrate has a polished region 13, wherein the roughness of the polished region 13 is reduced in comparison with the non-polished region and the total reflection thereof is increased as a result. In the embodiment depicted, the polished region 13 corresponds to the region on which a connection layer 16 and a converter material 14 are subsequently applied. Preferably, a highly reflective layer 18, in particular an Ag-based layer, is furthermore applied, wherein the highly reflective layer is situated between the polished region 13 of the converter substrate 12 and a transparent connection layer 16, for example a more transparent adhesive. If the polished region has a reflectivity sufficient for the purpose, applying a highly reflective layer 18 can also be dispensed with, however.

LIST OF REFERENCE SIGNS

10 Converter wheel
12 Converter substrate
13 Polished region of the converter substrate
14 Converter material
16 Connection layer
18 Highly reflective layer 20 First substrate layer
22 Second substrate layer
24 Third substrate layer

What is claimed is:

1. An optical converter wheel, comprising:
a converter substrate; and
an inorganic converter material on the converter substrate, the inorganic converter material converts light of a first wavelength into light of a second wavelength,
wherein the converter substrate has a coefficient of thermal expansion ($CTE_{KS}$) of 4 to $18 \times 10^{-6}$ 1/K in a range from 20° C.-300° C.,
wherein the converter substrate has a thermal conductivity of at least 50 W/mK at 20° C.,
wherein the inorganic converter material is a ceramic converter material, and
wherein the inorganic converter material is on the converter substrate in a monolithic ring or in one or more ring segments at an outer diameter of the converter substrate.

2. The optical converter wheel of claim 1, wherein the coefficient of thermal expansion is 5 to $10 \times 10^{-6}$ 1/K in the range from 20° C.-300° C. and the thermal conductivity is at least 150 W/mK at 20° C.

3. The optical converter wheel of claim 1, wherein the converter substrate comprises a material selected from a group consisting of a ceramic K1, a metal M1, a ceramic-metal composite KM, and any combinations thereof.

4. The optical converter wheel of claim 1, wherein the converter substrate comprises a ceramic K1 selected from a group consisting of silicon nitride, gallium arsenide, gallium nitride, aluminium nitride, aluminium carbide, silicon carbide, AlSiC, AlSi, beryllium oxide, CuC, and any combinations thereof.

5. The optical converter wheel of claim 1, wherein the converter substrate comprises a metal M1 that is selected from a group consisting of iron, nickel, copper, and any combinations thereof.

6. The optical converter wheel of claim 1, wherein the converter substrate comprises a ceramic-metal composite KM, wherein the ceramic K1 is selected from a group consisting of silicon nitride, gallium arsenide, gallium nitride, aluminium nitride, aluminium carbide, silicon carbide, AlSiC, AlSi, beryllium oxide, CuC, and any combinations thereof, and wherein the metal M1 is selected from a group consisting of iron, nickel, copper, and any combinations thereof.

7. The optical converter wheel of claim 6, wherein the ceramic-metal composite KM is a sandwich composite comprising a first layer of a first metal M2A, followed by a second layer of a ceramic K2, and a third layer of a second metal M2B, wherein the first and second metals M2A and M2B are identical or different.

8. The optical converter wheel of claim 6, wherein the ceramic K2 is aluminium oxide and the metal M2 is copper.

9. The optical converter wheel of claim 1, further comprising a connection layer connecting the inorganic converter material and the converter substrate.

10. The optical converter wheel of claim 9, wherein the connection layer is a material selected from a group consisting of an adhesive, a glass, a ceramic adhesive, a metallic solder compound, and any combinations thereof.

11. The optical converter wheel of claim 9, wherein the connection layer is formed at a temperature of at least 20° C.

12. The optical converter wheel of claim 1, wherein the inorganic converter material is a single-phase, porous optoceramic that comprises Ce as an active element and a ceramic phase $A_3B_5O_{12}$ where A is selected from a group of Y, Gd, Lu, and combinations thereof and B is selected from a group of Al, Ga, and combinations thereof.

13. The optical converter wheel of claim 12, wherein the single-phase, porous optoceramic has a density of <97%.

14. The optical converter wheel of claim 1, further comprising a reflective layer of a material selected from a group consisting of a silver layer, a Cr/Ag layer, a silver-based layer, and any combinations thereof.

15. The optical converter wheel of claim 1, further comprising a difference between the coefficient of a thermal expansion of the converter material ($CTE_{KM}$) and the coefficient of thermal expansion of the converter substrate ($CTE_{KS}$) is:

$$CTE_{KM} - CTE_{KS} = -5 \times 10^{-6} \text{ 1/K to } 2 \times 10^{-6} \text{ 1/K}.$$

16. A method for producing an optical converter wheel, comprising:
providing a converter substrate with a coefficient of thermal expansion ($CTE_{KS}$) of 4 to $18 \times 10^{-6}$ 1/K in a range from 20° C.-300° C. and a thermal conductivity of at least 50 W/mK at 20° C.; and
connecting a converter material to the converter substrate, the inorganic converter material converting light of a first wavelength into light of a second wavelength,
wherein the inorganic converter material is a ceramic converter material, and
wherein the inorganic converter material is on the converter substrate in a monolithic ring or in one or more ring segments at an outer diameter of the converter substrate.

17. The method of claim 16, further comprising connecting the converter material to the converter substrate with a connection layer.

18. The method of claim 16, further comprising applying a reflective layer on part of the converter substrate.

19. An optical converter wheel, comprising:
a converter substrate; and
an inorganic converter material on the converter substrate, the inorganic converter material converts light of a first wavelength into light of a second wavelength,
wherein the converter substrate has a coefficient of thermal expansion ($CTE_{KS}$) of 4 to $18 \times 10^{-6}$ 1/K in a range from 20° C.-300° C.,
wherein the converter substrate has a thermal conductivity of at least 50 W/mK at 20° C., and
wherein the converter substrate comprises a ceramic-metal composite KM, wherein the ceramic K1 is selected from a group consisting of silicon nitride, gallium arsenide, gallium nitride, aluminium nitride, aluminium carbide, silicon carbide, AlSiC, AlSi, beryllium oxide, CuC, and any combinations thereof, and wherein the metal M1 is selected from a group consisting of iron, nickel, copper, and any combinations thereof.

20. The optical converter wheel of claim 19, wherein the ceramic-metal composite KM is a sandwich composite comprising a first layer of a first metal M2A, followed by a second layer of a ceramic K2, and a third layer of a second metal M2B, wherein the first and second metals M2A and M2B are identical or different.

21. The optical converter wheel of claim 19, wherein the ceramic K2 is aluminium oxide and the metal M2 is copper.

* * * * *